United States Patent [19]

Schmifg

[11] 3,839,307

[45] Oct. 1, 1974

[54] PROCESS OF PRODUCING POLYVINYL ALCOHOL MICROGELS

[75] Inventor: John Joseph Schmifg, Newark, Del.

[73] Assignee: E. I. du Pont de Nemours and Company, Wilmington, Del.

[22] Filed: June 5, 1972

[21] Appl. No.: 259,551

[52] U.S. Cl... 260/86.1 E, 260/29.6 BM, 260/41 A, 260/41 B, 260/41 R, 260/78.5 SR, 260/85.7, 260/86 IN, 260/87.3, 260/91.3 VA, 117/104 R, 117/139.5 A, 117/155 UA
[51] Int. Cl............................ C08f 27/04, C08f 3/34
[58] Field of Search..................... 260/91 BA, 26.1 E

[56] References Cited
UNITED STATES PATENTS

| | | | |
|---|---|---|---|
| 2,518,193 | 8/1950 | Signaigo | 260/91.3 |
| 3,017,282 | 1/1962 | Brill | 106/287 |
| 3,097,097 | 7/1963 | Oster et al. | 96/35 |
| 3,258,442 | 6/1966 | Sinclair | 260/29.6 |
| 3,318,856 | 5/1967 | Deyrup | 260/91.3 |

Primary Examiner—Stanford M. Levin

[57] ABSTRACT

Polyvinyl alcohol microgels which comprise stable fluids comprising water and about 0.05 to 10 percent by weight of polyvinyl alcohol partially crosslinked with tetravalent titanium ions, said microgels being derived from polyvinyl alcohol which has a Hoeppler viscosity of about 4 to 150 centipoises and in which at least about 50 mole percent of the monomeric units are vinyl alcohol units, said partially crosslinked polyvinyl alcohol and water having a Brookfield viscosity of about 1.15 to 2000 centipoises, said viscosity being at least about 15 percent greater than the viscosity of the aqueous polyvinyl alcohol solution from which the microgel is derived, are useful as sizes for paper and paperboard, in paper and paperboard coatings, as warp sizes for textile fibers, as adhesives, and as soil and dust stabilizers.

8 Claims, No Drawings

PROCESS OF PRODUCING POLYVINYL ALCOHOL MICROGELS

BACKGROUND OF THE INVENTION

1. Field of the Invention

This invention relates to polyvinyl alcohol microgels and their use as paper and paperboard sizes, in paper and paperboard coatings, as textile warp sizes, as adhesives, and as soil and dust stabilizers.

2. Description of the Prior Art

Certain materials such as starch, sodium carboxymethyl cellulose, sodium alginate, and polyvinyl alcohol, with or without the addition of clay, have been used as surface sizes for paper and paperboard. By "surface size" is meant a material which is applied to the surface of the paper or paperboard, thereby forming a barrier which prevents or retards wicking and absorption of ink and other fluids into the paper or paperboard. Surface sizes are to be distinguished from internal sizes which are added in the process of making the sheet.

Although polyvinyl alcohol is many times more expensive than starch on a per pound basis, it has been shown that polyvinyl alcohol can perform as well as, or in many cases better than, starch as a surface size for paper or paperboard on an equal cost basis. However, in most use areas the improvement in performance has not been sufficient to cause former starch users to switch to polyvinyl alcohol. At present polyvinyl alcohol is definitely preferred to starch only in specialty areas where quality is important.

There is evidence that polyvinyl alcohol solutions readily penetrate into paper and paperboard. It is felt that even better performance for polyvinyl alcohol would be demonstrated if its "hold out" characteristics could be improved; that is, if penetration of polyvinyl alcohol size solutions into paper and paperboard could be substantially reduced or eliminated.

It is known that polyvinyl alcohol can be gelled by the addition of various gelling agents such as Congo Red, Direct Orange 8 (Colour Index 22120), Direct Green 12 (Colour Index 30290), borax, and various compounds of aluminum, chromium, copper, iron, titanium, vanadium and zirconium. In U.S. Pat. Nos. 2,720,468; 3,318,856; and 3,492,250 the use of various organo-titanium complexes to gel polyvinyl alcohol is taught. Since these gels are soft-to-rigid solids they are not useful as surface sizes for paper or as textile warp sizes.

A two step-sizing technique has recently been introduced which utilizes the reaction between polyvinyl alcohol and borax to control the penetration of the size solution into paper or paperboard. In this process the paper or paperboard is first pretreated with a borax solution, followed by application of the polyvinyl alcohol size solution. At borax levels above 2 percent by weight, based on the polyvinyl alcohol, a crosslinking reaction resulting in the formation of a rigid gel, takes place on the surface of the sheet, thus preventing excess penetration of the polyvinyl alcohol size. Although this process can reduce the cost of polyvinyl alcohol sizing, it has not been widely accepted because it introduces an additional step in the sizing operation.

SUMMARY OF THE INVENTION

In accordance with this invention a new form of aqueous polyvinyl alcohol, referred to hereinafter as polyvinyl alcohol microgel, has been discovered which exhibits superior hold out characteristics in uses such as the surface sizing of paper and paperboard. These microgels are stable, fluids containing water and 0.05 to 10 percent by weight of polyvinyl alcohol partially crosslinked with tetravalent titanium ions which may be prepared by the process which comprises mixing (a) water, (b) 0.05 to 10 percent by weight, based on the total water and polyvinyl alcohol components, of polyvinyl alcohol which has a Hoeppler viscosity of 4 to 150 centipoises and in which at least about 50 mole percent of the monomeric units are vinyl alcohol units, and (c) titanium complex selected from the group consisting of (1) salts of chelating organic acids of two to 10 carbon atoms, (2) water-soluble fluotitanates, (3) complexes with beta-diketones of the formula

in which R is hydrogen, lower-alkyl or aryl, and Y and Y' are aryl, cycloalkyl or lower-alkyl, and (4) complexes with tri(hydroxyalkyl) amines in which the alkyl groups contain one to six carbon atoms, said titanium complex being present in an amount sufficient to provide 0.05 to 10 parts by weight of tetravalent titanium ion per 100 parts of polyvinyl alcohol and converting said titanium complex to tetravalent titanium ion thereby forming a polyvinyl alcohol microgel having a Brookfield viscosity of 1.15 to 2000 centipoises, said viscosity being at least 15 percent greater than the viscosity of the aqueous polyvinyl alcohol solution from which the microgel is derived.

DETAILED DESCRIPTION OF THE INVENTION

The polyvinyl alcohol microgels prepared in accordance with this invention are stable fluids containing water and partially crosslinked polyvinyl alcohol. Although it is not intended that this invention be limited to any particular theory, it is believed that these microgels are entanglements of partially crosslinked polyvinyl alcohol chains possessing colloid-like properties dispersed in water.

The microgels described herein have characteristics which distinguish them from uncrosslinked polyvinyl alcohol, on the one hand, and gelled or substantially crosslinked polyvinyl alcohol on the other. These microgels contain polyvinyl alcohol which has been crosslinked sufficiently to increase the viscosity of the aqueous polyvinyl alcohol solution from which they are derived by at least about 15 percent, but insufficiently to increase the viscosity above about 2000 centipoises. This intermediate amount of crosslinking is referred to herein as partial crosslinking.

These microgels are distinguished from the intermediate stage through which aqueous polyvinyl alcohol passes during gelling to a solid, in that they are stable fluids rather than being in a transient state. By "stable" is meant a product which is viscosity stable and stable against precipitation or layer separation for a period of at least two days. This period of stability is sufficient to allow the use of freshly prepared microgels in sizing applications.

The microgels described herein have the unique characteristic of being fluid, while at the same time, exhibiting superior hold out characteristics when applied to the surface of paper or paperboard. In other words, these microgels will wet (that is, exhibit low surface tension resulting in a small contact angle), but will not readily penetrate, adsorbent paper.

The term "polyvinyl alcohol", as used throughout the specification and claims, refers to the product obtained by replacing all or a portion of the acyl groups in a polyvinyl ester with hydroxyl groups. Well-known methods of preparing polyvinyl alcohol include the hydrolysis, alcoholysis or saponification of a polyvinyl ester. Suitable polyvinyl esters include polyvinyl formate, polyvinyl acetate, polyvinyl propionate, polyvinyl butyrate, and the like. The preferred polyvinyl ester is polyvinyl acetate.

The polyvinyl alcohol used in the process of this invention may be a homopolymer or a copolymer. When the polyvinyl alcohol is derived from a polyvinyl ester homopolymer, it is generally referred to as a polyvinyl alcohol homopolymer, regardless of whether it is partially or fully hydrolyzed; that is, whether only a portion or all of the acyl groups in the original polyvinyl ester have been replaced by hydroxyl groups.

When the polyvinyl alcohol is derived from a polyvinyl ester copolymer, it is generally referred to as a polyvinyl alcohol copolymer. The term "copolymer", as used throughout the specification and claims, is intended to include polymers derived from two or more copolymerizable monomers, for example, dipolymers, terpolymers, etc. The polyvinyl alcohol copolymer may be partially or fully hydrolyzed; that is, only a portion or all of the hydrolyzable acyl groups in the original copolymer may have been replaced by hydroxyl groups.

In any event, at least about 50 mole percent of the monomeric units in the resulting polyvinyl alcohol, whether it be a homopolymer or a copolymer, should be vinyl alcohol units. In the case of a polyvinyl alcohol homopolymer, this means that the polyvinyl alcohol should be at least about 50 mole percent hydrolyzed. When less than about 50 mole percent of the monomeric units in the polyvinyl alcohol are vinyl alcohol units, the polyvinyl alcohol may no longer have sufficient water solubility or hydroxyl functionality to be suitable for forming a microgel in accordance with this invention. Preferably, at least about 85 mole percent, and more preferably at least about 93 mole percent of the monomeric units in the polyvinyl alcohol are vinyl alcohol units.

Any ethylenically unsaturated monomer which will copolymerize with vinyl acetate may be used for preparing polyvinyl alcohol copolymers. Typical monomers include alpha,beta-unsaturated aliphatic hydrocarbons such as ethylene, propylene, butylene, isobutylene, hexene, dodecene, octadecene, and the like; unsaturated lower-aliphatic mono- and di-carboxylic acids such as acrylic, methacrylic, maleic, maleic anhydride, fumaric, itaconic, and the like; lower-alkyl esters of unsaturated lower-aliphatic mono- and di-carboxylic acids such as methyl, ethyl, propyl, isopropyl, butyl, isobutyl, and tert.-butyl esters of acids such as acrylic, methacrylic, maleic, fumaric, itaconic, and the like; vinyl esters of saturated aliphatic acids such as vinyl formate, vinyl acetate, vinyl propionate, vinyl butyrate, vinyl pivalate, vinyl versatate, and the like; vinyl lower-alkyl esters such as methyl vinyl ether, ethyl vinyl ether, tert.-butyl vinyl ether, and the like; unsaturated aliphatic amides such as acrylamide, methacrylamide, dimethyl acrylamide, and the like; substituted amino lower-alkyl esters of unsaturated lower-aliphatic acids such as dimethylaminoethyl acrylate and methacrylate, diethylaminoethyl acrylate and methacrylate, diisopropylaminoethyl acrylate and methacrylate, and the like; and unsaturated aliphatic amines such as vinylamine which is obtained by copolymerizing with vinyl succinimide and treating with strong caustic, and the like.

The molecular weight of the polyviny alcohol should be such as to provide a Hoeppler viscosity of about 4 to 150 centipoises. The Hoeppler viscosities referred to herein are measured as a 4 percent aqueous solution at 20°C. by the falling ball method using a Hoeppler viscosimeter. This procedure is described in the Hoeppler Precision Viscosometer Operating Manual published by the Fish-Schurman Corp.

When the molecular weight of the polyvinyl alcohol corresponds to a viscosity of less than about 4 centipoises, uneconomically large amounts of crosslinking agent are necessary to cause microgel formation. When the molecular weight of the polyvinyl alcohol corresponds to a viscosity in excess of about 150 centipoises, formation of the microgel is difficult to control, in that significant amounts of solid gel are formed. Preferably the molecular weight corresponds to a Hoeppler viscosity of about 10 to 70 centipoises.

The preferred polyvinyl alcohols are those which have a Hoeppler viscosity of about 20 to 40 centipoises and in which at least about 93 mole percent of the monomeric units are vinyl alcohol units. One class of particularly preferred polyvinyl alcohols are homopolymers which are at least about 99 mole percent hydrolyzed. Another particularly preferred class of polyvinyl alcohols are copolymers derived about 94 to 98 percent by weight from vinyl acetate and about 2 to 6 percent by weight from methyl methacrylate and which are at least about 99 mole percent hydrolyzed.

The polyvinyl alcohol microgels prepared herein comprise water and about 0.05 to 10 percent by weight of polyvinyl alcohol which is partially crosslinked. When the microgel contains no components other than water and partially crosslinked polyvinyl alcohol, the water content of the microgel is, of course, about 90 to 99.95 percent by weight. In this range of concentrations the microgels are readily applied and give satisfactory results in a variety of use applications. Preferably, the microgel contains about 1 to 8 percent of partially crosslinked polyvinyl alcohol, and most preferably about 2 to 6 percent.

The polyvinyl alcohol microgels described herein have Brookfield viscosities of about 1.15 to 2000 centipoises.

This viscosity; that is, the viscosity of the partially crosslinked polyvinyl alcohol and water should be at least about 15 percent greater than the viscosity of the aqueous polyvinyl alcohol solution from which the microgel is derived. The percent increase in viscosity is determined by measuring the Brookfield viscosity of the aqueous polyvinyl alcohol at the same temperature and concentration before and after it is partially crosslinked to form the microgel. Preferably, the microgel has a Brookfield viscosity of about 25 to 1000 centipoises, and most preferably about 35 to 5000 centipoises. The Brookfield viscosities referred to herein are determined at 25°C. using a Brookfield Viscometer, Model RVT, operating at 100 revolutions per minute, as described in the manual from Brookfield Engineering Laboratories, Inc.

The polyvinyl alcohol microgels described herein may also contain other ingredients which make them especially suitable for a particular use. For example, when the microgel is to be used for paper or paperboard sizing, it may be desirable to incorporate a finely divided filler such as clay or calcium carbonate, or a pigment such as titanium dioxide.

The polyvinyl alcohol microgels described herein are prepared by partially crosslinking polyvinyl alcohol using tetravalent titanium ions as the crosslinking agent. Suitable sources of these ions are titanium complexes which may be added as such or formed in situ in the process. One class of suitable complexes includes titanium salts of chelating organic acids of two to 10 carbon atoms. Suitable organic acids include oxalic, maleic, itaconic, lactic, tartaric, citric, salicylic, and the like. Such salts can be prepared in situ for example by reacting a tetraalkyl titanate such as tetraisopropyl titanate with the acid. It has been found that a little alcohol aids in keeping this salt in solution. In some cases water-soluble fluotitanates such as sodium fluotitanate, potassium fluotitanate, and the like may be used.

Another class of suitable titanium complexes includes titanium complexes with beta-diketones of the formula

in which R is hydrogen, lower-alkyl or aryl, and Y and Y' are aryl, cycloalkyl or lower-alkyl. Typical β-diketones of this structure include 2,4-pentanedione, 2,4-hexanedione, 2,4-heptanedione, 5-methyl-2,4-hexanedione, 2,4-octanedione, 5,5-dimethyl-2,4-hexanedione, 3-ethyl-2,4-pentanedione, 2,4-decanedione, 2,2-dimethyl-3,5-nonanedione, 3-methyl-2,4-pentanedione, 2,4-tridecanedione, 1-cyclohexyl-1,3-butanedione, 5,5-dimethyl-1,3-cyclohexanedione, 1,3-cyclohexanedione, 1-phenyl-1,3-butanedione, 1(4-biphenyl)-1,3-butanedione, 1-phenyl-1,3-pentanedione, 3-benzyl-2,4-pentanedione, 1-phenyl-5,5-dimethyl-2,4-hexanedione, 1-phenyl-2-butyl-1,3-butanedione, and dibenzoylmethane. The preferred β-diketone is 2,4-pentanedione which complexes with titanium to form titanium acetylacetonate.

Another class of suitable titanium complexes includes titanium complexes with tri(hydroxylalkyl) amines in which the alkyl groups contain two to six carbon atoms. Typical examples include triethanol amine, tripropanol amine, triisopropanol amine, tributanol amine, trihexanol amine, mixed hydroxylalkyl amines, and mixtures thereof.

The process of this invention for preparing polyvinyl alcohol microgels comprises mixing (a) water, (b) 0.05 to 10 percent by weight of suitable polyvinyl alcohol, based on the total water and polyvinyl alcohol components, and (c) titanium complex in an amount sufficient to provide 0.05 to 10 parts by weight of tetravalent titanium ion per 100 parts of polyvinyl alcohol. The titanium complex reacts with the dissolved polyvinyl alcohol thereby forming the polyvinyl alcohol microgel.

In some cases, the pH must be adjusted before the titanium complex will react with the polyvinyl alcohol. For example, when using titanium salts of carboxylic acids such as potassium titanium oxalate or titanium citrate, the pH should be adjusted to about 6 to 10 and preferably about 7 to 9. Suitable water-soluble alkaline materials for controlling pH include the hydroxides and orthosilicates of alkali metals such as lithium, sodium, potassium, and the like; ammonium hydroxide; and the hydroxides of alkaline earth metals such as calcium, strontium, and barium; and the like. Sodium and ammonium hydroxides are preferred.

In the case of titanium lactate, pH control is not necessary for microgel formation, although more efficient use of the titanium ion can be achieved by pH control. Titanium complexes with beta-diketones such as titanium acetylacetonate also react directly with polyvinyl alcohol to form microgels without adjustment of the pH. Dissolution of titanium acetylacetonate is assisted by the presence of a small amount of alcohol.

The specific amount of tetravalent titanium ion within the above range used to partially crosslink the polyvinyl alcohol will depend upon factors such as the concentration of the polyvinyl alcohol, the molecular weight of the polyvinyl alcohol, the desired final viscosity, etc. The amount should be controlled so as to provide a microgel having a Brookfield viscosity of about 1.15 to 2000 centipoises. In most cases about 0.2 to 2 parts by weight of tetravalent titanium ion is used per 100 parts of polyvinyl alcohol.

Since the microgels described herein contain a large amount of water, it is not economical to transport them long distances. Moreover, they should be prepared only a short time before they are to be used, since they may not be stable for more than several days. Accordingly, it is preferred that these microgels be supplied on a commercial basis as a dry blend of microgel precursor ingredients. This method has the advantages of lower transportation costs, more uniform product quality, and minimal microgel preparation difficulties. For example, polyvinyl alcohol can be dry mixed with a suitable solid titanium complex such as titanium citrate, titanium lactate or potassium titanium oxalate to form the commercial product.

A preferred precursor blend is one containing polyvinyl alcohol and titanium citrate. When ready for use, this blend is dissolved in water, and sufficient base, such as ammonium hydroxide, is added to adjust the pH to 9 to 10, whereby the microgel is formed.

Another technique of preparing a dry microgel precursor mixture is to spray finely divided, dry polyvinyl alcohol with a suitable amount of a solution containing a titanium complex. For example, a solution containing a mixture of ethyl alcohol, lactic acid, and tetraisopropyl titanate may be used. The sprayed solution is adsorbed by the polyvinyl alcohol powder which remains essentially dry. When ready for use, this product is dissolved in water with heating. It appears that the ingredients first react to form titanium lactate and then the microgel forms directly without need of pH adjustment.

The microgels described herein are especially useful as sizes for paper and paperboard, in coatings, as textile warp sizes, as stabilizers for soil and dust, and in adhesives. The application techniques for these uses are well known to those skilled in the art. In each case microgels are used in a manner similar to the manner in which polyvinyl alcohol solutions have been used except that microgels may be used in lower polymer concentrations than polyvinyl alcohol solutions. For example, in the sizing of printing paper, the water and oil absorbency characteristics of paper or paperboard surface coated with the microgel of this invention in many cases are approximately equivalent to those of the same substrate coated with polyvinyl alcohol solution having twice the concentration.

EXAMPLES OF THE INVENTION

The following examples, illustrating the polyvinyl alcohol microgels described herein and the method of their preparation and use, are given without any intention that the invention be limited thereto. All parts and percentages are by weight. In each of these examples the Hoeppler viscosities given for the various polyvinyl alcohols refer to a 4 percent solution at 20°C.

EXAMPLE 1

A solid blend of 12 grams of polyvinyl alcohol which was 99.5 percent hydrolyzed and had a Hoeppler viscosity of 30 centipoises, 0.15 gram of titanium citrate, and 0.2 gram of citric acid monohydrate was dissolved in 250 ml. of water in a steam bath. The solution was cooled and made up to 300 grams total solution weight at 25°C. This solution had a pH of 4.3 and a Brookfield viscosity of 59 centipoises. One ml. of $NH_4OH$ was added to this solution. The resulting 4 percent microgel was clear, had a pH of 9.6 and a Brookfield viscosity of 100 centipoises.

16-Point paperboard was sized using a No. 16 Meyer rod and the above polyvinyl alcohol microgel. The sized board was then dried in an oven at 120°C. for 25 seconds. To the dried paperboard was applied a drop of water which took 47 minutes to penetrate completely.

This procedure was repeated 4 days later. At this time the polyvinyl alcohol microgel had a Brookfield viscosity of 90 centipoises. A water drop was applied to the sized board and took 45 minutes to penetrate completely.

Four more days later, the polyvinyl alcohol microgel had a Brookfield viscosity of 83 centipoises. A water drop applied to paperboard sized with this microgel by the above procedure took 26 minutes to penetrate completely.

For comparison, the same paperboard was sized with a No. 16 Meyer rod and a 6 percent solution of the same medium molecular weight PVA which had not been converted to a microgel. A 6 percent polyvinyl alcohol solution was chosen for this comparison because it had a Brookfield viscosity of 106 centipoises which closely approximates the 100 centipoises viscosity of the 4 percent microgel above. A water drop applied to the sized and dried paperboard took 22 minutes to penetrate completely.

For further comparison, a water drop was applied to the same unsized paperboard. This drop took only 50 seconds to penetrate completely.

EXAMPLE 2

Twelve grams of a copolymer which contained 96 percent vinyl alcohol and 4 percent methyl methacrylate, had a Hoeppler viscosity of 30 centipoises, and was 99 percent hydrolyzed was blended with 0.21 grams of citric acid monohydrate and 0.15 grams of titanium citrate. This blend was then dissolved in approximately 250 grams of hot water. The resulting solution was cooled and made up with water to a total solution weight of 300 grams at 25°C. The pH of the solution was 4.1 and the Brookfield viscosity was 56 centipoises. Four milliliters of reagent grade ammonium hydroxide were added with stirring. The resulting microgel was crystal clear and had a Brookfield viscosity of 120 centipoises.

EXAMPLE 3

Ten grams of a medium molecular weight polyvinyl alcohol-vinyl versatate, 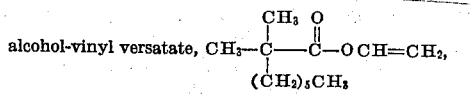 copolymer derived 96 percent from polyvinyl alcohol and 4 percent from vinyl versatate was mixed with 0.12 gram of titanium citrate and 0.20 gram of citric acid monohydrate. This mixture was dissolved in hot water and made up with water to 300 grams total solution weight at 25°C. The Brookfield viscosity was 48 centipoises and the pH was 3.3. Addition of 3 ml. of ammonium hydroxide produced a clear fluid having a viscosity of 88 centipoises and a pH of 9.8.

EXAMPLE 4

To 100 grams of a 4 percent aqueous solution of the polyvinyl alcohol described in Example 1 was added a sufficient amount of a mixture containing equal parts of ethyl alcohol, lactic acid, and tetraisopropyl titanate to prepare a stable, fluid microgel with a Brookfield viscosity of 100 centipoises. This microgel was then diluted to 4000 grams with water. The resulting fluid was sprayed on a 2 inch deep sample of coal slack obtained from the Champion pond of the Consolidation Coal Co., Pittsburgh, Pa. The amount of fluid applied corresponded to 6000 gallons per acre. After drying for four days, this sample of stabilized surface was tested for durability. The sample was covered with water and allowed to dry, and then covered with water and allowed to dry a second time. Then the sample was placed 1 foot below a water tap operating at 15 psi. water pressure. The time that it took for the water to erode its way through the 2 inch sample was 20 minutes.

For comparison, a sample of the coal slack which was sprayed with the same weight of unreacted polyvinyl alcohol, and treated in the same manner, withstood the water for 1.5 minutes.

For further comparison, an unsprayed sample of the coal slack which was treated in the same manner withstood the water for only 0.2 minute.

EXAMPLE 5

Forty-two grams of a 10 percent aqueous solution of the polyvinyl alcohol described in Example 1 was added to 58 grams of water. The resulting solution had a Brookfield viscosity of 45 centipoises and a pH of 6.0. To this solution was added 0.2 gram of tetraisopropyl titanate dissolved in 0.2 gram of lactic acid and 2 grams of methyl alcohol. The resulting material was a stable, viscous fluid with a Brookfield viscosity of 185 centipoises and a pH of 3.3. This fluid wet, but did not penetrate, adsorbent paper.

EXAMPLE 6

For comparison the following 3 samples were prepared:
a. 3.5 percent aqueous polyvinyl alcohol microgel having a Brookfield viscosity of 86 centipoises. This microgel was prepared using the polyvinyl alcohol and the procedure described in Example 5.
b. 3 percent aqueous polyvinyl alcohol solution containing the polyvinyl alcohol used to prepare the microgel of sample (a) above and having a Brookfield viscosity of 38 centipoises.
c. 9 percent aqueous starch solution containing hydroxylated starch having a Brookfield viscosity of 46 centipoises.

These three samples were used to size 17 point cylinder paperboard on a Beloit size press pilot coater. Samples were coated with the nip pressure of the applicator roll held at 15 and 30 psi. with the paperboard running through at a constant speed of 300 feet per minute.

At the conclusion of the sizing runs, the surface sized paperboards were tested to measure their printability using the Vanceometer test described in TAPPI Routine Control Method 278. This test measures the rate at which a sample of a silicone oil having a viscosity of 32.6 centipoises penetrates into the paperboard. In performing this test, the sample was clamped on a slight inclined plane hinged so that it could be raised against a light aperture. A few drops of the oil were placed on the sample after it had been clamped to the incline plane and a steel roller was allowed to roll down the plane, smearing the drop of oil so that the oil smear covered the aperture when the inclined plane was raised. The rate at which the oil is absorbed is measured by observing the rate of decrease of the reflected light reading using an incident angle of light of 70°.

Water resistance of each board was tested by putting a water drop on the surface-sized board and recording the time that it took for the drop to disappear. The data obtained are given in Table I.

TABLE I

| Coating Solution | Nip Pressure, psi. | Oil resistance, vanceometer microamperes at designated time in seconds | | | | | water absorption in seconds |
|---|---|---|---|---|---|---|---|
| | | 0 | 20 | 40 | 60 | 90 | |
| 3.5% microgel | 30 | 96 | 96 | 96 | 95 | 94 | 390 |
| | 15 | 93 | 93 | 92 | 91 | 89 | 435 |
| 3% polyvinyl alcohol | 30 | 84 | 76 | 65 | 55 | 44 | 105 |
| | 15 | 74 | 68 | 58 | 51 | 43 | 100 |
| 9% starch | 30 | 84 | 80 | 74 | 68 | 60 | 60 |
| | 15 | 93 | 91 | 87 | 82 | 75 | 85 |
| raw stock | — | 56 | 38 | 35 | 34 | 34 | 45 |

EXAMPLE 7

Twelve grams of the finely divided, solid polyvinyl alcohol described in Example 1 were sprayed with 2 grams of a mixture of ethyl alcohol (1 part), 85 percent lactic acid (1 part), and tetraisopropyl titanate (1 part). The coated polyvinyl alcohol was then added to 288 grams of water on a steam bath and stirred until dissolved. The solution was cooled and made up with water to 300 grams total weight at 25°C. The resulting fluid microgel was clear and had a Brookfield viscosity of 92 centipoises.

For comparison, 12 grams of the same solid polyvinyl alcohol used above, but uncoated, were stirred with 250 grams of water in a steam bath until dissolved. The solution was cooled and made up with water to 300 grams total weight at 25°C. The resulting solution had a Brookfield viscosity of 56 centipoises.

EXAMPLE 8

To 10 gallons of an aqueous solution containing 4 percent of the polyvinyl alcohol described in Example 1 was added a sufficient amount of a mixture of equal parts of ethyl alcohol, lactic acid, and tetraisopropyl titanate to raise its Brookfield viscosity to 100 centipoises. This solution was used to size unbleached Kraft paperboard on a Beloit size press pilot coater operating at 250 feet per minute with a nip pressure of 14 psi. A coating weight, equivalent to 40 lb. per ton of paperboard, was sufficient to give a smooth surface and fill in most of the pinholes.

EXAMPLE 9

425 milliliters of a 6 percent aqueous solution of the polyvinyl alcohol described in Example 1 was added to 1000 ml. of water. To this solution was added 100 ml. of a 3 percent aqueous solution of potassium titanium oxalate ($K_2Ti(OH)_2(C_2O_4)_2 \cdot H_2O$) with stirring, reducing the pH to 4.6. The Brookfield viscosity of this solution was 28 centipoises. Ammonium hydroxide was added with stirring in an amount sufficient to bring the pH to 6.8. A stable 1.7 percent microgel having a Brookfield viscosity of 42 centipoises resulted. When this fluid was dropped onto absorbent paper toweling, it took 109 seconds for a drop to penetrate into the toweling.

For comparison, polyvinyl alcohol solutions were made up in various concentrations using the same polyvinyl alcohol, but without microgel formation. Each of these solutions were dropped onto the absorbent paper toweling. The penetration time of a drop of the 1.0 percent solution was 2 seconds, the 2.0 percent solution was 4 seconds, the 3.0 percent solution was 12 seconds, the 4.0 percent solution was 23 seconds, the 5.0 percent solution was 50 seconds, and the 6.0 percent solution was 135 seconds.

EXAMPLE 10

A dry mixture consisting of 25 parts of the polyvinyl alcohol described in Example 1 and 0.5 part of potassium titanium oxalate was added to 1000 parts of water and heated to approximately 90°C. with stirring for a time sufficient to dissolve the solid materials. The Brookfield viscosity of this solution was 38 centipoises. After cooling, sufficient ammonium hydroxide was added to this solution to raise the pH to 6.8. A stable fluid resulted having a Brookfield viscosity of 48 centipoises. When this fluid was dropped onto absorbent paper toweling, it took 438 seconds for a drop to penetrate into the toweling.

EXAMPLE 11

785 grams of the polyvinyl alcohol described in Example 1 and 72.5 grams of potassium titanium oxalate were mixed as a dry powder and added to 37,500 grams of water and heated to 80°–90°C. with stirring until the solids were dissolved. To prevent foaming during this dissolution, 1.5 ml. of a polyoxyalkylene derivative of propylene glycol (Pluronic L-61) was added. The solution was cooled to 25°C. with stirring. To this solution was added sufficient ammonium hydroxide to increase the Brookfield viscosity from about 28 centipoises to about 50 centipoises The resulting stable fluid had a partially crosslinked polyvinyl alcohol concentration of 2.1 percent. This fluid was applied as a surface size to paperboard using a Beloit size press pilot coater. The fluid applied smoothly with no operational difficulties. The resulting board was superior in both water resistance and oil resistance to board sized in the same manner with a 3 percent aqueous polyvinyl alcohol solution.

a. 3.5 percent polyvinyl alcohol microgel having a pH of 8.0 and a Brookfield viscosity of 145 centipoises. This microgel was obtained using the polyvinyl alcohol and the procedure described in Example 13.

b. 2.75 percent polyvinyl alcohol microgel having a pH of 7.8 and a Brookfield viscosity of 65 centipoises. This microgel was obtained using the polyvinyl alcohol and the procedure described in Example 13.

c. 3.0 percent solution of the polyvinyl alcohol used to prepare the above microgels. The solution had a pH of 6.0 and a Brookfield viscosity of 40 centipoises.

d. 9 percent starch having a Brookfield viscosity of 20 centipoises.

The four solutions were used to size "hard" internally sized paperboard on a Beloit size press pilot coater. The nip pressure of the applicator roll was held at 30 psi. and the paperboard was run through at a constant speed of 300 feet per minute.

Each of the sized paperboards was tested to measure oil resistance using the vanceometer test described in Example 6. The data obtained are given in Table II.

TABLE II

| Coating Solution | Oil resistance, vanceometer microamperes at designated time in seconds | | | | | | | | | | |
|---|---|---|---|---|---|---|---|---|---|---|---|
| | 0 | 30 | 60 | 90 | 120 | 150 | 180 | 210 | 240 | 270 | 300 |
| 3.5% microgel | 100 | 100 | 100 | 100 | 100 | 99 | 99 | 98 | 98 | 97 | 97 |
| 2.75% microgel | 99 | 97 | 94 | 92 | 88 | 85 | 81 | 78 | 73 | 70 | 65 |
| 3.0% polyvinyl alcohol | 78 | 36 | 26 | 23 | 22 | 22 | 20 | 21 | 20 | 20 | 20 |
| 9.0% starch | 83 | 36 | 26 | 23 | 22 | 21 | 21 | 21 | 21 | 21 | 21 |
| raw stock | 72 | 28 | 26 | 24 | 24 | 24 | 24 | 24 | 24 | 24 | 24 |

EXAMPLE 12

425 milliliters of a 6 percent aqueous solution of polyvinyl alcohol which was 88 percent hydrolyzed and had a Hoeppler viscosity of 40 centipoises was added to 1000 ml. of water with stirring. To this solution 100 ml of a 3 percent aqueous solution of potassium titanium oxalate was added with stirring, reducing the pH to 4.6. The Brookfield viscosity of the solution was 28 centipoises. Ammonium hydroxide was added to the resulting solution in an amount sufficient to raise the pH of the solution to 6.2. The resulting material was a stable fluid with a Brookfield viscosity of 50 centipoises. This fluid wet, but did not readily penetrate, absorbent paper.

EXAMPLE 13

A 10 percent aqueous solution (52.5 grams) of the polyvinyl alcohol described in Example 1 was added to 97.5 grams of water. The resulting solution had a Brookfield viscosity of 44 centipoises and a pH of 5.8. To this solution was added 0.25 gram of titanium acetylacetonate dissolved in .06 gram of isopropyl alcohol and 2.1 grams of methyl alcohol. The resulting material was a stable fluid with a Brookfield viscosity of 104 centipoises and a pH of 6.0. This fluid wet, but did not penetrate, absorbent paper.

EXAMPLE 14

For comparison, the following four samples were prepared:

EXAMPLE 15

Forty grams of a 10 percent aqueous solution of the polyvinyl alcohol described in Example 1 was added to 60 grams of water. The resulting solution had a Brookfield viscosity of 48 centipoises and a pH of 6.0. To this solution was added 0.18 grams of titanium triethanolamine in 1.8 grams of methyl alcohol. The resulting material was a stable, viscous fluid with a Brookfield viscosity of 128 centipoises and a pH of 8.4. This fluid wet, but did not penetrate, absorbent paper.

EXAMPLE 16

Twelve grams of the polyvinyl alcohol described in Example 1 was blended with 0.12 gram of titanium citrate and 0.1 gram of citric acid. The mixture was dissolved in hot water and made up with water to 300 grams total solution weight at 25°C. The Brookfield viscosity was 64 centipoises and the pH was 4.4. Addition of 2 ml. of a 10 percent sodium hydroxide solution produced a clear, uniform fluid having a viscosity of 100 centipoises and a pH of 11.

EXAMPLE 17

Fifteen grams of the polyvinyl alcohol described in Example 1 was dissolved in hot water and made up with water to 300 grams total solution weight at 25°C. The Brookfield viscosity of this solution was 71 centipoises. To this solution was added 0.46 gram of titanium acetylacetonate dissolved in 3.54 grams of methyl alcohol. The resulting fluid was uniform and had a Brookfield viscosity of 870 centipoises.

Although the invention has been described and exemplified by way of specific embodiments, it is not intended that it be limited thereto. As will be apparent to those skilled in the art, numerous modifications and variations of these embodiments can be made without departing from the spirit of the invention or the scope of the following claims.

I claim:

1. A process for preparing a stable, fluid polyvinyl alcohol microgel containing water and 0.05 to 10 percent by weight of polyvinyl alcohol partially crosslinked with tetravalent titanium ions which comprises mixing (a) water, (b) 0.05 to 10 percent by weight, based on the total water and polyvinyl alcohol components, of polyvinyl alcohol which has a Hoeppler viscosity of 4 to 150 centipoises measured as a 4 percent aqueous solution at 20°C. by the falling ball method, and in which at least 50 mole percent of the monomeric units are vinyl alcohol units, and (c) a titanium salt of a chelating organic acid of two to 10 carbon atoms which is present in an amount sufficient to provide 0.05 to 10 parts by weight of tetravalent titanium ion per 100 parts by weight of polyvinyl alcohol and converting said titanium complex to tetravalent titanium ion by adjusting the pH to 6 to 10 thereby forming a polyvinyl alcohol microgel having a Brookfield viscosity of 1.15 to 2000 centipoises, said viscosity being at least 15 percent greater than the viscosity of the aqueous polyvinyl alcohol solution from which the microgel is derived.

2. The process of claim 1 in which the mixture contains 4 to 8 percent by weight of polyvinyl alcohol which has a Hoeppler viscosity of 10 to 70 centipoises and in which at least 85 mole percent of the monomeric units are vinyl alcohol units, and the microgel has a Brookfield viscosity of 25 to 1000 centipoises.

3. The process of claim 2 in which the mixture contains 2 to 6 percent by weight of polyvinyl alcohol which has a Hoeppler viscosity of 20 to 40 centipoises and in which at least 93 mole percent of the monomeric units in the polyvinyl alcohol are vinyl alcohol units, and the microgel has a a Brookfield viscosity of 30 to 500 centipoises.

4. The process of claim 1 in which the polyvinyl alcohol is a homopolymer which is at least 99 mole percent hydrolyzed.

5. The process of claim 4 in which the titanium complex is titanium citrate.

6. The process of claim 1 in which the polyvinyl alcohol is a copolymer derived 94 to 98 percent by weight from vinyl acetate and 2 to 6 percent by weight from methyl methacrylate and is at least 99 mole percent hydrolyzed.

7. The process of claim 6 in which the titanium complex is titanium citrate.

8. A dry polyvinyl alcohol microgel precursor mixture which comprises solid polyvinyl alcohol which has a Hoeppler viscosity of 4 to 150 centipoises measured as a 4 percent aqueous solution at 20°C. by the falling ball method and in which at least 50 mole percent of the monomeric units are vinyl alcohol units sprayed with a liquid mixture of lactic acid and tetraisopropyl titanate in an amount sufficient to provide 0.05 to 10 parts by weight of tetravalent titanium ion per 100 parts by weight of polyvinyl alcohol.

* * * * *

PO-1050
(5/69)

UNITED STATES PATENT OFFICE
CERTIFICATE OF CORRECTION

Patent No. 3,839,307      Dated October 1, 1974

Inventor(s) John Joseph Schmieg

It is certified that error appears in the above-identified patent and that said Letters Patent are hereby corrected as shown below:

Cover Sheet, Column 1, under "United States Patent [19]" and [75] "Schmifg" should be -- Schmieg --.

Column 13, line 31, "4" should be -- 1 --.

Column 14, line 8, delete "a" first occurrence.

Signed and sealed this 7th day of January 1975.

(SEAL)
Attest:

McCOY M. GIBSON JR.
Attesting Officer

C. MARSHALL DANN
Commissioner of Patents